July 5, 1927.
S. J. BENS
SPROCKET CHAIN OR LINK BELT
Original Filed April 23, 1921
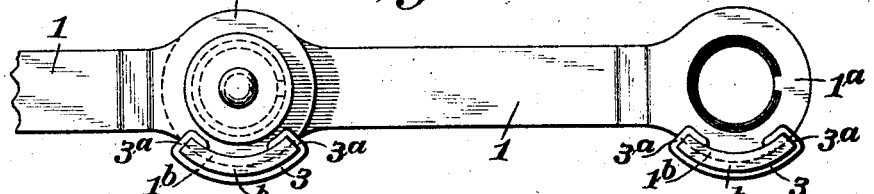
Fig.1.
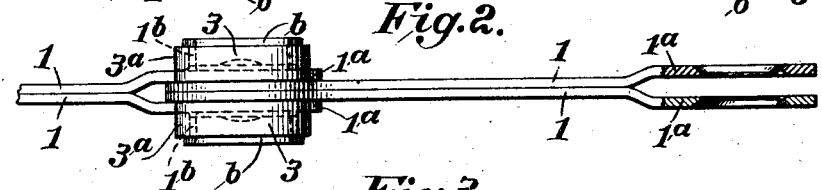
Fig.2.
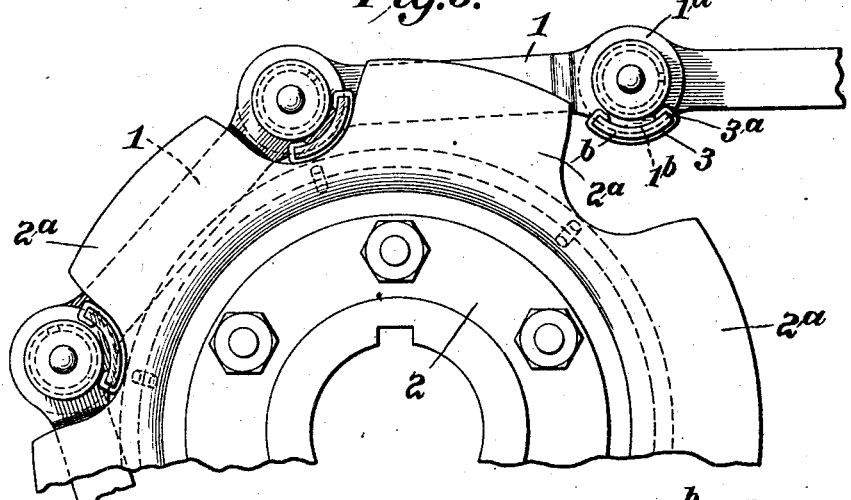
Fig.3.
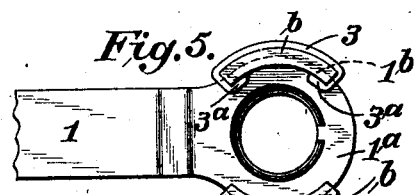
Fig.5.
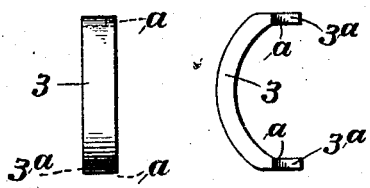
Fig.4.ᵃ  Fig.4.
Fig.6.
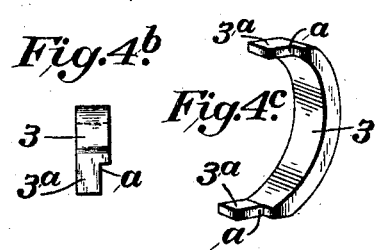
Fig.4.ᵇ  Fig.4.ᶜ
Fig.7.
Inventor:
Samuel J. Bens, Patented July 5, 1927.

1,634,647

UNITED STATES PATENT OFFICE.

SAMUEL J. BENS, OF NEW YORK, N. Y., ASSIGNOR TO CHAIN SAW CORPORATION, OF WILMINGTON, DELAWARE, A CORPORATION OF DELAWARE.

SPROCKET CHAIN OR LINK BELT.

Substitute for application Serial No. 463,835, filed April 23, 1921. This application filed November 16, 1926. Serial No. 148,764.

My present invention relates to improvements in sprocket chains or link belts and aims to provide a construction which will be much more durable or long lived than chains heretofore in use.

The invention comprises in its broadest aspect a chain having its links provided with wear plates at the points where they contact with the teeth of the sprocket, which is the point of greatest wear. The invention further includes the provision of removable wear plates whereby such plates, when worn, can be replaced without the necessity of discarding the whole chain.

The invention further comprises the novel construction and arrangement and combination of parts hereinafter described and particularly defined by the appended claims.

The preferred embodiment of my invention is illustrated in the accompanying drawing in which—

Figure 1 is a side elevation of a portion of a chain (one whole link and a portion of an adjoining link).

Figure 2 is an edge or top plan view of the same, partly in section.

Figure 3 is a side elevation showing the chain in position upon a sprocket wheel.

Figures 4, 4$^a$, 4$^b$ and 4$^c$ are detail views of one of the wear pieces.

Figure 5 is a detailed view in side elevation of one end of one of the links, showing a modification.

Figure 6 is a plan view of the same, and

Figure 7 is an end view.

In this drawing I have, for convenience of illustration shown only a chain designed to be driven continuously in one direction but it will be understood that my invention is not limited to any particular form or type of chain, that shown being typical of any desired construction.

The links are indicated in the drawings by the numerals 1, 1, and in the form shown these are each formed of two strips of metal, as for instance sheet metal abutting for the greater part of their length and spread apart or separated at one end, as indicated at 1$^a$ to provide a forked portion, between the forks of which are pivotally connected the ends of the next link by any approved or desired form of pivot. The form of chain shown is adapted for use in connection with a sprocket having two sets of spaced teeth which straddle the narrow portion of one link and bear against the ends of the forked portion of the next adjacent link, the sprocket wheel being indicated at 2 and the teeth thereof at 2$^a$. This sprocket forms the subject of a companion application filed of even date herewith.

To protect these end portions of the link from wear, and to enable them to be readily renewed when worn I prefer to construct them in the following manner. At their ends the portions 1$^a$ are widened out or struck up as indicated at 1$^b$ where the thickness of the metal of which the link is made is not sufficient for this purpose, as is likely to be the case where the links are stamped up from sheet metal, such form being desirable as a relatively thin body gives ample strength while producing an extremely light chain. In such case the portions 1$^b$ may conveniently be formed by stamping or swaging into the form of arc shaped outwardly turned flanges which are curved on the arc of a circle concentric with the axis of the pivot connecting the adjoining links. Upon the face of each of these flanges I apply a wear plate designed to receive the thrust of the tooth, such wear plate being indicated at 3. These wear plates are made of arc shape to correspond to the curved faces of the flanges which they overlie, and may be secured thereto in any suitable manner. An important feature of my invention is the making of these wear plates removable so that they can readily be removed when worn, and to accomplish this in a simple and economical manner I construct the wear plates with end tongues which project beyond the terminal edges of the arc-shaped flanges and are designed to be bent around said edges as indicated at 3$^a$. To hold the wear plates against lateral displacement in an outward direction the flanges 1$^b$ may be provided with outwardly turned ribs $b$ which abut against the outer edges of the wear plates. The tongues 3$^a$ are provided with cut away or rebated portions $a$ which enables the inner edges of the wear plates to lie flush with the inner faces of the forks of the chain links. It will be noticed that inward movement of the wear plates is prevented by the engagement of the inner edges of the tongues with the outer faces of the link forks.

By a construction such as above described the wear plates may be made of a much harder and wear-resisting material than the chain links which enables the latter to be constructed from material which lends itself readily to being easily worked into proper shape, as for example by stamping from sheet metal. The making of the wear plates removable enables them to be removed and replaced when worn, thus avoiding the necessity of discarding the whole chain.

It will be understood that the wear plates may be made of dimensions corresponding to the size and curvature of the sprocket wheels upon which the chain is to be used.

In order to economically apply and remove the wear plates pliers may be used having suitable jaws for engaging and bending the projections.

If desired, two sets of wear plates may be applied to each link so as to make the chain universal or capable of being passed around one or more deflecting sprockets, such double set of wear plates being shown in Figs. 5 and 7.

As will be evident to those skilled in the art, my invention permits of various modifications without departing from the spirit thereof or the scope of the appended claims.

This application is based upon my application No. 463,835, filed April 23, 1921, allowed December 18, 1922, and now held among the abandoned files.

Having thus described my invention what I claim is:

1. A link belt or chain having links provided with laterally extended flanges, and wear plates secured upon the outer faces of said flanges.

2. A link belt or chain having links provided with arc-shaped laterally extending flanges, and arc shaped wear plates having end projections extending around the ends of said arc shaped portions.

3. A link belt or chain having links provided with arc-shaped laterally turned flanges provided with retaining ribs, and arc-shaped wear plates fitting against said ribs and having their ends extending around the ends of said arc-shaped portions.

4. A link belt or chain comprising a series of links each having a forked end designed to receive the end of the next adjoining link the forked portions of said links having laterally extending flanges, and arc-shaped wear plates secured to said flanges.

In testimony whereof, I affix my signature.

SAMUEL J. BENS.